US010732678B2

(12) United States Patent
Shaw et al.

(10) Patent No.: US 10,732,678 B2
(45) Date of Patent: Aug. 4, 2020

(54) INFORMATION HANDLING SYSTEM WITH INTEGRATED LIFT HINGE AIRFOIL

(71) Applicant: DELL PRODUCTS, LP, Round Rock, TX (US)

(72) Inventors: Timothy C. Shaw, Austin, TX (US); Travis C. North, Cedar Park, TX (US)

(73) Assignee: Dell Products, L.P., Round Rock, TX (US)

(*) Notice: Subject to any disclaimer, the term of this patent is extended or adjusted under 35 U.S.C. 154(b) by 0 days.

(21) Appl. No.: 16/129,653

(22) Filed: Sep. 12, 2018

(65) Prior Publication Data

US 2020/0081500 A1    Mar. 12, 2020

(51) Int. Cl.
| | |
|---|---|
| *G06F 1/16* | (2006.01) |
| *H05K 5/00* | (2006.01) |
| *H05K 7/00* | (2006.01) |
| *E05D 11/10* | (2006.01) |
| *E05D 1/04* | (2006.01) |
| *E05D 7/04* | (2006.01) |

(52) U.S. Cl.
CPC ............ *G06F 1/1681* (2013.01); *E05D 1/04* (2013.01); *E05D 7/04* (2013.01); *E05D 11/10* (2013.01); *G06F 1/1616* (2013.01); *G06F 1/1641* (2013.01); *E05Y 2900/606* (2013.01)

(58) Field of Classification Search
CPC .. E05D 1/04; E05D 7/04; E05D 11/10; E05D 1/05; G06F 1/1616; G06F 1/1641; G06F 1/1681; G06F 1/1675
See application file for complete search history.

(56) References Cited

U.S. PATENT DOCUMENTS

| | | | | |
|---|---|---|---|---|
| 6,816,371 | B2 * | 11/2004 | Agata | G06F 1/203 165/121 |
| 7,096,678 | B2 * | 8/2006 | Petroski | G06F 1/20 257/E23.099 |
| 7,457,113 | B2 * | 11/2008 | Kumhyr | G06F 1/203 165/80.3 |
| 7,602,606 | B2 | 10/2009 | Schlesener et al. | |
| 9,104,374 | B2 * | 8/2015 | Tsai | G06F 1/1616 |
| 9,477,269 | B2 * | 10/2016 | Morrison | G06F 1/1681 |
| 2007/0154318 | A1 * | 7/2007 | Saltman | F01D 5/141 416/241 R |
| 2013/0077241 | A1 * | 3/2013 | Senatori | G06F 1/203 361/694 |
| 2014/0009888 | A1 * | 1/2014 | MacDonald | G06F 1/1681 361/701 |
| 2014/0287675 | A1 | 9/2014 | Labrecque | |

\* cited by examiner

*Primary Examiner* — Anthony M Haughton
(74) *Attorney, Agent, or Firm* — Larson Newman, LLP

(57) ABSTRACT

An information handling system includes a base cover, an exhaust port, a hinge knuckle, and an airfoil. The exhaust port is positioned above the base cover. The hinge knuckle is coupled to the base cover, and diverts airflow from the exhaust port. The airfoil is mounted on the base cover between the exhaust port and the hinge knuckle, and inclines up from the base cover and away from the exhaust port.

20 Claims, 5 Drawing Sheets

INFORMATION HANDLING SYSTEM WITH INTEGRATED LIFT HINGE AIRFOIL

FIELD OF THE DISCLOSURE

The present disclosure generally relates to information handling systems, and more particularly relates to an information handling system with an integrated lift hinge airfoil.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a base cover, an exhaust port, a hinge knuckle, and an airfoil. The exhaust port is positioned above the base cover. The hinge knuckle is coupled to the base cover, and diverts airflow from the exhaust port. The airfoil is mounted on the base cover between the exhaust port and the hinge knuckle, and inclines up from the base cover and away from the exhaust port.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
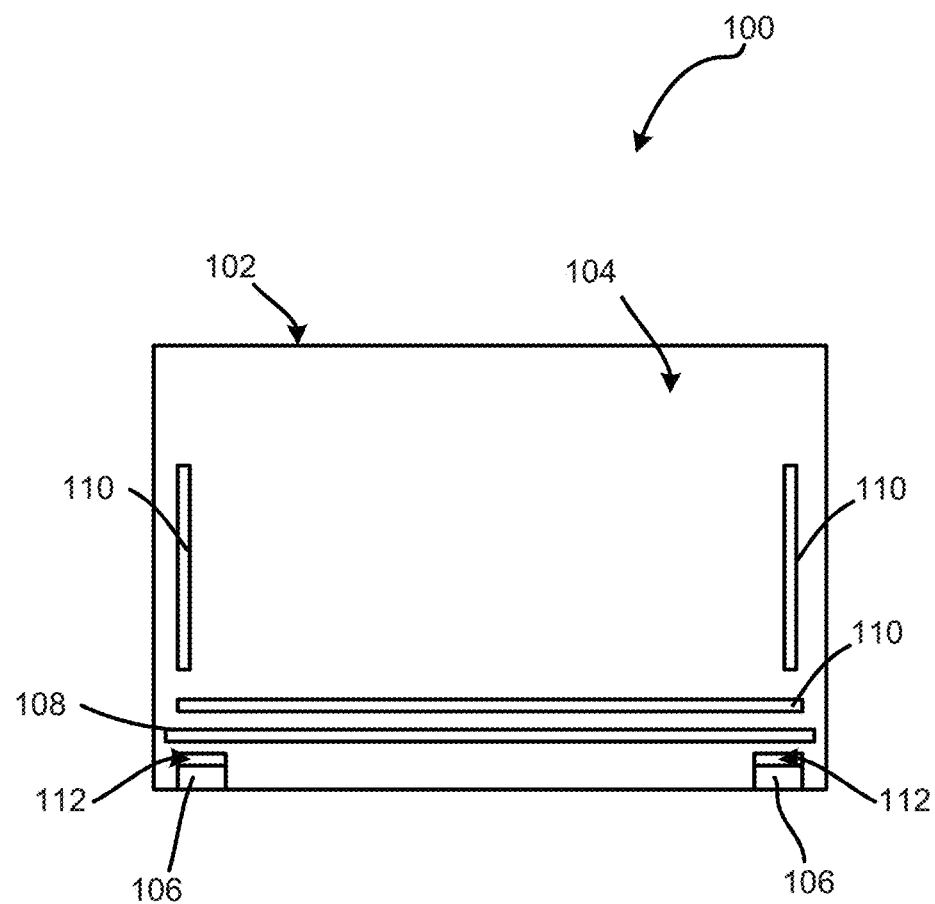
FIG. 1 is a diagram of a bottom surface of an information handling system according to at least one embodiment of the disclosure.

FIG. 1 shows an information handling system 100 according to at least one embodiment of the disclosure. For purpose of this disclosure information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price.

The information handling system 100 includes a base cover 102, which in turn includes a bottom surface 104. The information handling system 100 also includes hinge knuckles 106 connected to the base cover 102, a foot 108 mounted on the bottom surface 104, and air intake vents 110 disposed at different locations of the bottom surface 104. The hinge knuckles 106 couple the base cover 102 to a display mount cover, such as display mount cover 202 of FIG. 2. When the information handling system 100 is placed on a surface, the foot 108 can be placed in physical communication with the surface and can block hot air expelled from gaps 112 in front of the hinge knuckles 106 from being recirculated into the air intake vents 110.

Figure 4:
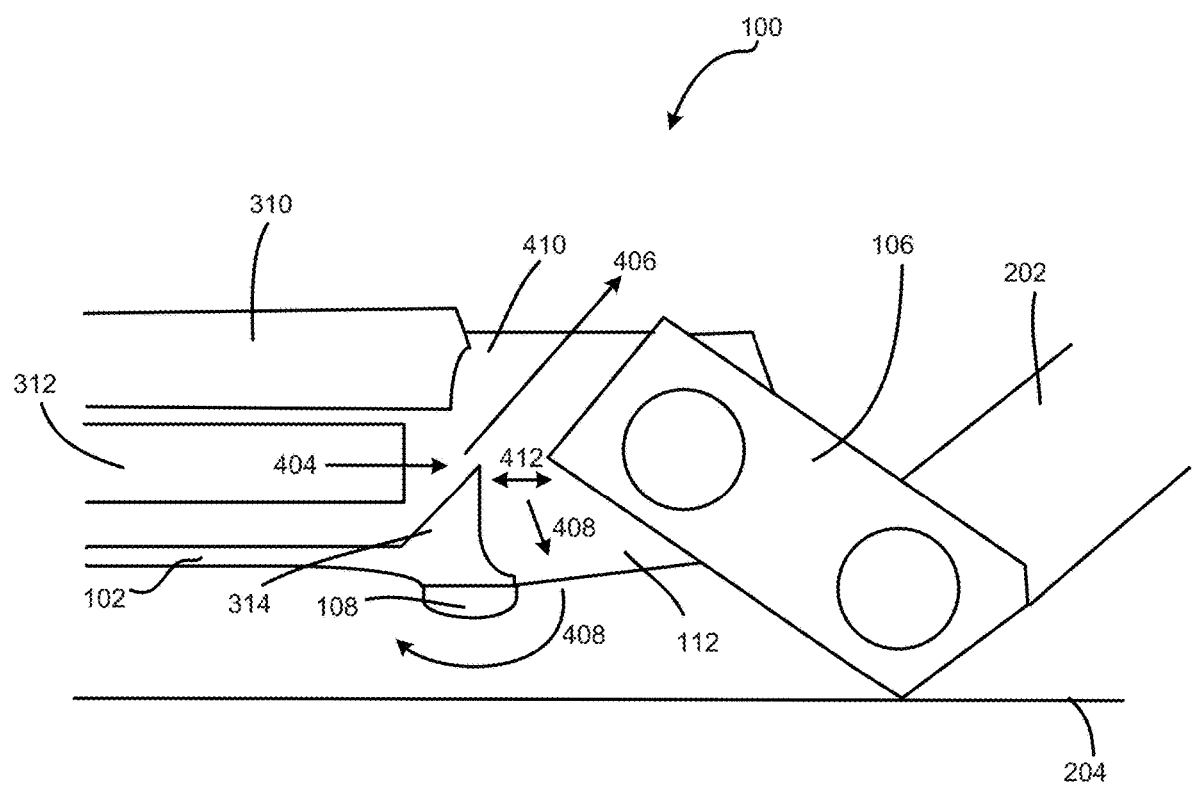
FIG. 4 is a cross sectional view of the portion of the information handling system in an open position according to at least one embodiment of the disclosure.

Each of the hinge knuckles 106 can rotate around a lower axis while the display mount cover is moved to an open position so that a user can view a display screen within the display mount cover. The hinge knuckles 106 can sweep from 0 to 180 degrees around the lower axis and can hide a lower border around the display screen when the information handling system 100 is opened. However, the rotation of the hinge knuckles 106 around the lower axis can cause the foot 108 to lift off a surface that the information handling system 100 is resting on top of, as shown in FIG. 4. In this situation, the foot 108 can no longer block the hot airflow diverted by the hinge knuckles 106 into gaps 112, such that the hot airflow can recirculate back into the information handling system 100 via the air intake vents 110. The recirculation of the hot airflow diverted by the hinge knuckles 106 can severely impact the ability of the information handling system 100 to dissipate heat generated by the components of the information handling system 100.

Figure 2:
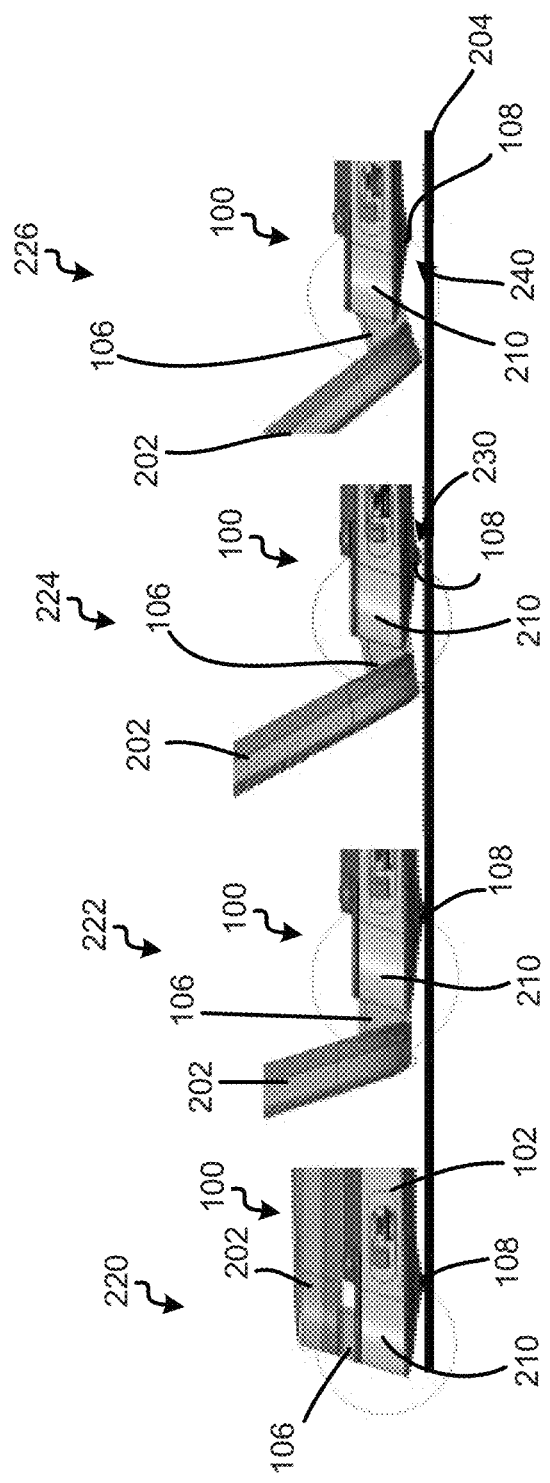
FIG. 2 is a diagram of a portion of the information handling system in a sequence of different amounts of rotation of a hinge knuckle of the information handling system according to at least one embodiment of the disclosure.

FIG. 2 illustrates a portion of the information handling system 100 including the base cover 102, the hinge knuckle 106, the foot 108, and the display mount cover 202 in a sequence of four stages 220, 222, 224, and 226 of rotation for the hinge knuckle 106 to change a position of the display mount cover 202 according to at least one embodiment of the disclosure. At stage 220, the information handling system 100 can be sitting on a surface 204 with the foot 108 in physical communication with the surface 204. In stage 220, the hinge knuckle 106 has not rotated an amount around a point of rotation 210, such that the display mount cover 202 is in a closed position.

At stage 222, the knuckle hinge 106 has rotated a first amount around rotation point 210, such that the display mount cover 202 is in a position that a user of the information handling system can see the display within the display mount cover 202. In an embodiment, the rotation of the knuckle hinge 106 around rotation point 210, at stage 222, can be around 100 degrees from a reference point when the information handling system 100 is in a closed position as in stage 220. At stage 222, foot 108 can still be in physical contact with the surface 204, such that the foot 108 can block hot airflow from recirculating into the air intake vents 110 of FIG. 1.

At stage 224, the knuckle hinge 106 has rotated a second amount around rotation point 210 from the reference point when the information handling system 100 is in a closed position as in stage 220. In an embodiment, the rotation of the knuckle hinge 106 around rotation point 210, at stage 224, can be around 120 degrees. At stage 224, the display mount cover 202 has been placed in physical communication with the surface 204 and the foot 108 is no longer in physical contact with the surface 204, such that a first space 230 exist between the foot 108 and the surface 204. Thus, at stage 224, the foot 108 can no longer block hot airflow from recirculating into the air intake vents 110 of FIG. 1.

At stage 226, the knuckle hinge 106 has rotated a third amount around rotation point 210 from the reference point. In an embodiment, the rotation of the knuckle hinge 106 around rotation point 210, at stage 226, can be around 130 degrees. At stage 226, a second space 240 exist between the foot 108 and the surface 204, such that it is possible for even more hot airflow to recirculate into the air intake vents 110 of FIG. 1. In an embodiment, a typical rotation of the hinge knuckle 106 for a user is in a range of 115 or 125 degrees, such that during normal operation of the information handling system 100 the foot 108 is no longer in physical contact with the surface 204.

Figure 3:
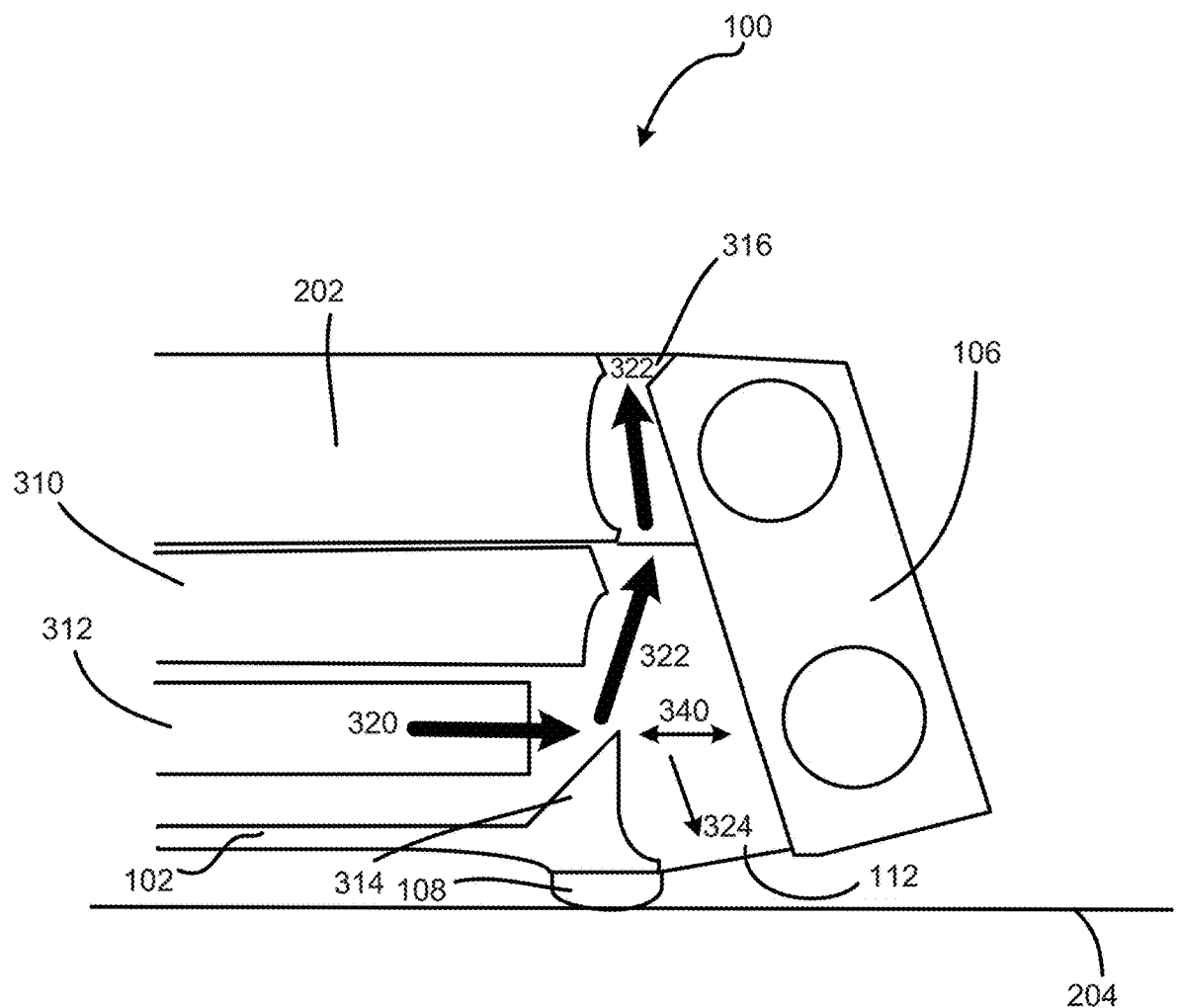
FIG. 3 is a cross sectional view of a portion of the information handling system in a closed position according to at least one embodiment of the disclosure.

FIG. 3 illustrates a cross section of a portion of the information handling system 100 in a closed position according to at least one embodiment of the disclosure. The information handling system includes the base cover 102, the hinge knuckle 106, the foot 108, the display mount cover 202, a keyboard cover 310, an exhaust port 312, and an airfoil 314. In an embodiment, the exhaust port 312 provides airflow 320 from heat exchanger fins to cool components of the information handling system 100. In an embodiment, the airfoil 314 can be made of the same material as the base cover 102, can be plastic or other material with less heat conductivity than the base cover, can have a covering, such as an aerogel with less heat conductivity than the base cover, or the like. The airfoil 314 being or covered with a material that has less heat conductivity that the base cover 102 can reduce an amount of heat transferred from the hot airflow 320 to the base cover 102.

In an embodiment, the airfoil 314 can be mounted on the base cover 102 and can incline up from the base cover 102 and away from the exhaust port 312 as shown in FIG. 3. In an embodiment, the incline of the airfoil can be a fixed include within the range of 15 to 60 degrees. In another embodiment, the airfoil 314 can be coupled with the hinge knuckle 106 such that the degree of incline of the airflow 314 can be activity changed based on and in response to the rotation of the knuckle hinge 106 to manipulate the exhaust airflow velocity vector.

While the information handling system 100 is in the closed position, as shown in FIG. 3, an air gap 316 between the hinge knuckle and the display mount cover 202 can allow the airflow 322 to exhaust out of the information handling system 100. The airflow 320 can leave the exhaust port 312 and hit the top of the airfoil 314, which can divert the airflow up towards the keyboard cover 310 and the air gap 316. However, contact of the airflow 320 with the hinge knuckle 106 can divide the airflow 320 into two portions 322 and 324. The incline of the airfoil 314 can cause airflow portion 322 to be the majority portion of the airflow 320 with airflow portion 324 only being a minor portion of the airflow 320. Thus, airfoil 314 can divert the majority hot airflow 320, from exhaust port 312 to ambient air above the air gap 316 while a small portion leaves the information handling system through gap 112. Additionally, the size of a space 340 between the airfoil 314 and the hinge knuckle 106 can enable airflow 324 to be exhausted from the information handling system 100 in add in the cooling of the information handling system 100.

FIG. 4 is a diagram of the cross section of the portion of the information handling system in an open position according to at least one embodiment of the disclosure. The information handling system includes the base cover 102, the hinge knuckle 106, the foot 108, the display mount cover 202, the keyboard cover 310, the exhaust port 312, and the airfoil 314. Airflow 404 can leave the exhaust port 312 and hit the top of the airfoil 314, which can divert the airflow up towards a gap 410 between the hinge knuckle 106 and the keyboard cover 310. However, contact of the airflow 404 with the hinge knuckle 106 can divide the airflow 404 into two portions 406 and 408. The incline of the airfoil 314 can cause airflow portion 406 to be the majority portion of the airflow 404 with airflow portion 408 only being a minor portion of the airflow 404. Thus, airfoil 314 can divert the majority hot airflow 404, from exhaust port 312 to ambient air above the gap 410 while a small portion leaves the information handling system through gap 112.

In FIG. 4, information handling system 100 is in an open position, such that the display mount cover 202 is in physical contact with the surface 204. Additionally, the rotation of the hinge knuckle 106 is such that the physical contact between the display mount cover 202 and the surface 204 causes the foot 108 to lift off the surface 204. As a result, hot airflow 408 can be recirculated into the information handling system 100 via the air intake vents 110 of FIG. 1 based on the foot 108 no longer being in contact with the surface 204. Thus, the incline of the airfoil 314 combined with the location of the hinge knuckle 106 an amount of hot airflow 408 recirculated into the information handling system 100 is greatly reduced as compared to a layout of an information handling system without the airfoil 314. Additionally, locational proximity of the airfoil 314 to the hinge knuckle 106 can provide enable a space 412 between the airfoil 314 and the hinge knuckle 106 to be sufficiently small to provide airflow restriction to airflow 408. Thus, the space 412 can further reduce an amount of the hot airflow 408 recirculated into the information handling system 100.

Figure 5:
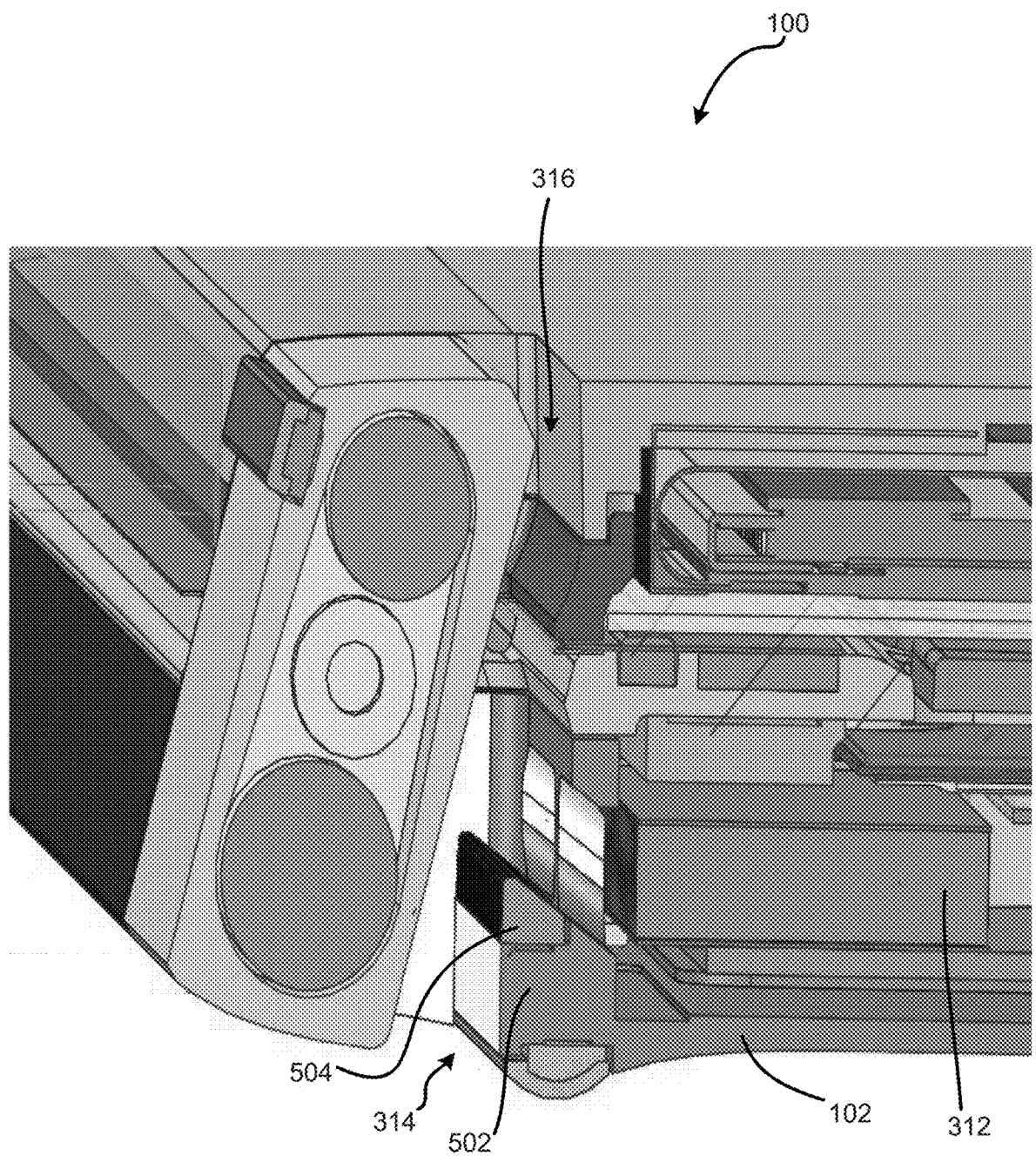
FIG. 5 is a perspective view of a cross section of the information handling system according to at least one embodiment of the disclosure.

FIG. 5 a perspective view of a cross section of the information handling system 100 according to at least one embodiment of the disclosure. The information handling system 100 includes the base cover 102, the exhaust port 312, and the airfoil 314. In an embodiment, the airfoil 314 can include a main portion 502 and a top portion 504. The main portion 502 can be formed with and integrated with the base cover 102, such that the main portion 502 is the same material as the base cover 102. In this embodiment, the main portion 502 can be aluminum or other metal and can provide additional structure to the airfoil 314.

The top portion 504 can be made from a material with less heat conductivity that the material of the main portion 502 and the base cover 102. In an embodiment, the majority of the airflow from the exhaust port 312 can hit the top portion 504, which in turn can reduce the heat transfer to the main portion 502 of the airfoil 314 and the base cover 102. The lower amount of heat transfer into the base cover 102 can enable a temperature of the base cover 102 to stay lower and thereby increase a customer experience of the information handling system 100. In an embodiment, the top portion 504 can be a dark color, such as black, so that if a user looks through the air gap 316 the airfoil 314 will not be noticeable to the user.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a base cover;
    a keyboard cover;
    an exhaust port positioned in between the base cover and the keyboard cover, and above the base cover, wherein the exhaust port provides a path for airflow from heat fins within the information handling system;
    a hinge knuckle coupled to the base cover, wherein the hinge knuckle diverts the airflow from the exhaust port; and
    an airfoil mounted on the base cover between the exhaust port and the hinge knuckle, wherein the airfoil inclines up from the base cover and away from the exhaust port, wherein the airfoil diverts the airflow up towards the keyboard cover.

2. The information handling system of claim 1, wherein the diverted airflow is divided between a first portion that flows toward a display mount cover of the information handling system, and a second portion that flows below the base cover.

3. The information handling system of claim 2, further comprising:
    a foot mounted on a bottom surface of the base cover, the foot to block the second portion of the diverted airflow from recirculating into air intakes of the information handling system when a rotation of the knuckle hinge is below a threshold rotation, and to no longer block the second portion of the airflow when the rotation of the knuckle hinge is above the threshold rotation.

4. The information handling system of claim 2, wherein incline of the airfoil directs a larger amount of the airflow to the first portion over the second portion.

5. The information handling system of claim 1, wherein the airfoil includes a main portion in physical communication with the base cover, and a top portion mounted on top of the main portion, the main portion made from the same material as the base cover and the top portion made from a material having a lower heat conductivity as compared to the base cover.

6. The information handling system of claim 1, further comprising:
an air gap located between the knuckle hinge and a display mount cover of the information handling system.

7. The information handling system of claim 6, wherein the airfoil directs a first portion of the airflow from the exhaust port up and out of the air gap when the display mount cover is closed.

8. The information handling system of claim 1, wherein the airfoil includes a coating material to reduce heat transfer from the airflow to the airfoil.

9. An information handling system comprising:
a base cover;
a keyboard cover;
an exhaust port positioned in between the base cover and the keyboard cover, and above the base cover, wherein the exhaust port provides a path for airflow from heat fins within the information handling system;
a hinge knuckle coupled to the base cover, wherein the hinge knuckle diverts the airflow from the exhaust port;
an air gap located between the knuckle hinge and a display mount cover of the information handling system; and
an airfoil mounted on the base cover between the exhaust port and the hinge knuckle, wherein the airfoil inclines up from the base cover and away from the exhaust port, the airfoil to direct a first portion of the airflow up and out of the information handling system through the air gap.

10. The information handling system of claim 9, wherein the diverted airflow is divided between the first portion, and a second portion that flows below the base cover.

11. The information handling system of claim 10, further comprising:
a foot mounted on a bottom surface of the base cover, the foot to block the second portion of the diverted airflow from recirculating into air intakes of the information handling system when a rotation of the knuckle hinge is below a threshold rotation, and to no longer block the second portion of the airflow when the rotation of the knuckle hinge is above the threshold rotation.

12. The information handling system of claim 10, wherein incline of the airfoil directs a larger amount of the airflow to the first portion over the second portion.

13. The information handling system of claim 9, wherein the airfoil includes a main portion in physical communication with the base cover, and a top portion mounted on top of the main portion, the main portion made from the same material as the base cover and the top portion made from a material having a lower heat conductivity as compared to the base cover.

14. The information handling system of claim 9, wherein the airfoil includes a coating material to reduce heat transfer from the airflow to the airfoil.

15. An information handling system comprising:
a base cover;
a keyboard cover;
an exhaust port positioned in between the base cover and the keyboard cover, and above the base cover, wherein the exhaust port provides a path for airflow from heat fins within the information handling system;
a hinge knuckle coupled to the base cover, wherein the hinge knuckle diverts the airflow from the exhaust port;
an air gap located between the knuckle hinge and a display mount cover of the information handling system; and
an airfoil mounted on the base cover between the exhaust port and the hinge knuckle, wherein the airfoil inclines up from the base cover and away from the exhaust port, the airfoil to direct a first portion of the airflow up and out of the information handling system through the air gap, wherein an amount of incline of the airfoil varies based on a degree of rotation for the hinge knuckle.

16. The information handling system of claim 15, wherein the diverted airflow is divided between the first portion, and a second portion that flows below the base cover.

17. The information handling system of claim 16, further comprising:
a foot mounted on a bottom surface of the base cover, the foot to block the second portion of the diverted airflow from recirculating into air intakes of the information handling system when a rotation of the knuckle hinge is below a threshold rotation, and to no longer block the second portion of the airflow when the rotation of the knuckle hinge is above the threshold rotation.

18. The information handling system of claim 16, wherein incline of the airfoil directs a larger amount of the airflow to the first portion over the second portion.

19. The information handling system of claim 16, wherein geometric manipulation of the airfoil and hinge knuckle optimize the air gap at specific angular rotations of the hinge knuckle.

20. The information handling system of claim 15, wherein the airfoil includes a main portion in physical communication with the base cover, and a top portion mounted on top of the main portion, the main portion made from the same material as the base cover and the top portion made from a material having a lower heat conductivity as compared to the base cover.

* * * * *